(12) United States Patent
Spahn (10) Patent No.: US 9,207,332 B2
(45) Date of Patent: Dec. 8, 2015

(54) COUNTING DIGITAL X-RAY IMAGE DETECTOR WITH TWO SWITCHABLE MODES

(71) Applicant: Martin Spahn, Erlangen (DE)

(72) Inventor: Martin Spahn, Erlangen (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 14/502,860

(22) Filed: Sep. 30, 2014

(65) Prior Publication Data

US 2015/0090893 A1    Apr. 2, 2015

(30) Foreign Application Priority Data

Sep. 30, 2013 (DE) .......... 10 2013 219 740

(51) Int. Cl.
*G01J 1/42* (2006.01)
*G01T 1/29* (2006.01)
*G01T 1/17* (2006.01)

(52) U.S. Cl.
CPC .............. *G01T 1/2928* (2013.01); *G01T 1/17* (2013.01)

(58) Field of Classification Search
CPC ................................ G01T 1/17; G01T 1/2928
See application file for complete search history.

(56) References Cited

U.S. PATENT DOCUMENTS

| | | | |
|---|---|---|---|
| 7,500,784 B2 | 3/2009 | Grebner et al. | |
| 2008/0099689 A1* | 5/2008 | Nygard et al. | 250/370.09 |
| 2009/0290680 A1 | 11/2009 | Tumer et al. | |
| 2011/0051901 A1 | 3/2011 | Michel et al. | |
| 2012/0085915 A1* | 4/2012 | Baeumer et al. | 250/370.09 |
| 2014/0016748 A1 | 1/2014 | Spahn | |

FOREIGN PATENT DOCUMENTS

| | | |
|---|---|---|
| DE | 102006006411 A1 | 8/2007 |
| DE | 102012202500 A1 | 8/2013 |
| DE | 102012212124 A1 | 1/2014 |

OTHER PUBLICATIONS

Chmeissani et al., "First experimental tests with a CdTe photon counting pixel detector hybridized with a Medipix2 readout chip," 2004, IEEE Transactions on Nuclear Science, vol. 51, No. 5, pp. 2379-2385.*
German Office Action cited in German Application No. 10 2013 219 740.3, mailed Mar. 6, 2014, with English Translation., German OA.
Martin Spahn, "Flat Detectors and their Clinical Applications," Eur Radiol., Apr. 2, 2005, pp. 1934-1947, vol. 15.

\* cited by examiner

*Primary Examiner* — Kiho Kim
(74) *Attorney, Agent, or Firm* — Lempia Summerfield Katz LLC

(57) ABSTRACT

The embodiments relate to a counting digital x-ray detector for recording x-ray images of an object irradiated by x-ray radiation with at least one detector module, which includes a flat direct converter for converting x-ray radiation into an electrical signal and a matrix with a plurality of counting pixel elements, wherein each counting pixel element includes a charge or signal input, a conversion facility for converting the electrical signal into a count signal, a digital counter for detecting and storing the count signal and a control and readout unit, and wherein the x-ray image detector is embodied such that each pixel element of the x-ray image detector is connected to the corresponding electrodes of the detector material of the direct converter via contacts and in this way is embodied switchably.

18 Claims, 9 Drawing Sheets

COUNTING DIGITAL X-RAY IMAGE DETECTOR WITH TWO SWITCHABLE MODES

CROSS-REFERENCE TO RELATED APPLICATIONS

This application claims the benefit of DE 10 2013 219 740.3, filed on Sep. 30, 2013, which is hereby incorporated by reference in its entirety.

TECHNICAL FIELD

The embodiments relate to a counting digital x-ray image detector for recording x-ray images of an object irradiated by x-ray radiation with at least one detector module, which has a flat direct converter for conversion of x-ray radiation into an electrical signal and a matrix with a plurality of counting pixel elements, wherein each counting pixel element has a charge or signal input, a conversion facility for conversion of the electrical signal into a count signal, a digital counter unit for capturing and storing the count signal and a control and readout unit, and wherein the x-ray image detector is embodied such that each pixel element of the x-ray image detector is connected to the corresponding electrodes of the detector material of the director converter via contacts (e.g., bump bonds) and in this way is embodied switchably.

BACKGROUND

Figure 1:
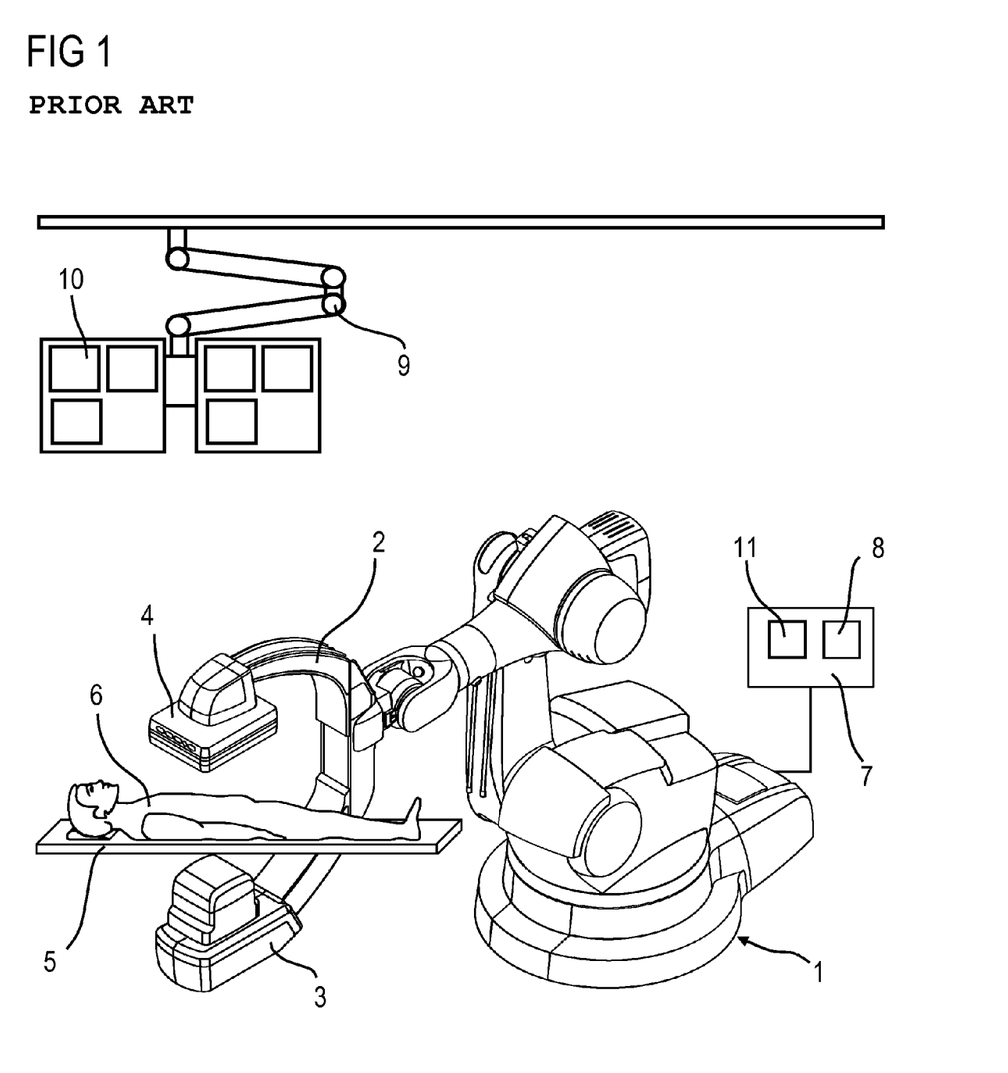
FIG. 1 depicts an embodiment of a C-arm angiography system with an industrial robot as its support facility.

X-ray systems are employed for imaging for diagnostic examination and for interventional procedures, (e.g., in cardiology, radiology and also surgery). FIG. 1 depicts such a monoplanar x-ray system presented by way of example, with a C-arm 2, held by a pedestal 1, in the form of a six-axis industrial or articulated-arm robot, to the ends of which an x-ray radiation source, (for example, an x-ray emitter 3 with x-ray tube and collimator, and an x-ray image detector 4 as image capturing unit), are attached.

By the articulated-arm robot, for example, from U.S. Pat. No. 7,500,784 B2, which may have six axes of rotation and thus six degrees of freedom, the C-arm 2 may be adjusted in any given spatial direction, for example, by the arm being rotated around a center of rotation between the x-ray emitter 3 and the x-ray image detector 4. The angiographic x-ray system 1 to 4 is able to be rotated around centers of rotation and axes of rotation in the C-arm plane of the x-ray image detector 4, e.g., around the center point of the x-ray image detector 4 and around the axes of rotation intersecting the center point of x-ray image detector 4.

The articulated-arm robot has a base frame that is mounted fixed to the floor, for example. Attached thereto is a carousel able to be rotated around a first axis of rotation. Attached to the carousel is a robotic motion link able to be pivoted around the second axis of rotation, to which a robot arm is fastened able to be rotated around a third axis of rotation. A robot hand able to be rotated around the fourth axis of rotation is attached to the robot arm. The robot hand has a fastening element for the C-arm 2, which is able to be pivoted around a fifth axis of rotation and rotated around a sixth axis of rotation running at right angles thereto.

The realization of the x-ray diagnostic device is not dependent on the industrial robot. Other conventional C-arm devices may also be used.

A patient 6 to be examined located on a table plate 5 of a patient support table as examination object is located in the beam path of the x-ray emitter 3. Connected to the x-ray diagnostic device is a system control unit 7 with a high-voltage generator for generating the tube voltage and an image system 8 that receives the image signals of the x-ray image detector 4 and processes them. The x-ray images may then be viewed on displays of a monitor stand 10 held by a ceiling-mounted, longitudinally-movable, pan and tilt and height-adjustable carrier system 9. Also provided in the system control unit 7 is a processing circuit 11, the function of which will be described below.

Instead of the x-ray system depicted by way of example in FIG. 1 with the stand 1 in the form of the six-axis industrial or articulated-arm robot, the angiographic x-ray system may also have a normal ceiling-mounted or floor-mounted holder for the C-arm 2.

Instead of the C-arm 2 depicted by way of example, the angiographic x-ray system may also have separate ceiling-mounted and/or floor-mounted holders for the x-ray emitter 3 and the x-ray image detector 4, which are electronically rigidly coupled for example.

Biplanar x-ray systems with two planes (e.g., two C-arms) may likewise be employed in interventional radiology.

The x-ray emitter 3 emits a ray bundle 12 emanating from a beam focus of its x-ray radiation source that strikes the x-ray image detector 4. If three-dimensional (3D) datasets are to be created in accordance with what is referred to as the DynaCT method, a method for rotation angiography, the rotatably supported C-arm 2 with x-ray emitter 3 and x-ray image detector 4 is rotated such that, as is depicted schematically from above onto the axis of rotation in FIG. 2, the x-ray emitter 3 depicted here graphically by its beam focus, as well as the x-ray image detector, 4 move around an object 13 to be examined located in the beam path of the x-ray emitter 3 on an orbital track 14. The arm may move around the orbital track 14 completely or partly to create a 3D data record.

Figure 2:
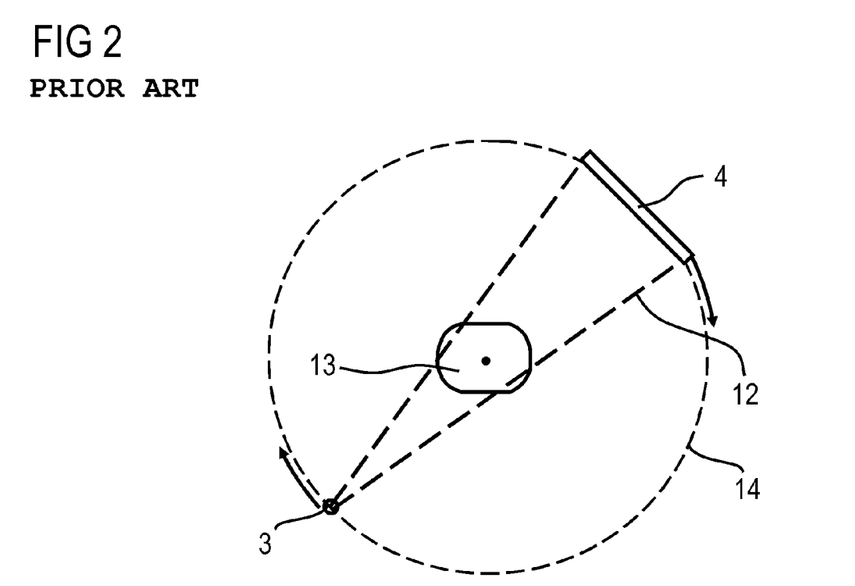
FIG. 2 depicts a schematic diagram of geometrical circumstances during rotation angiography with the C-arm angiography system in accordance with FIG. 1.

The C-arm 2 with x-ray emitter 3 and x-ray image detector 4 may move in this case, in accordance with the DynaCT method, around at least one angular range of 180°, (e.g., 180° plus beam angle), and records a rapid succession of projection images from different projections. The images may only be reconstructed from a part range of this recorded data.

The object 13 to be examined may for example involve an animal or human body but also a phantom body.

The x-ray emitter 3 and the x-ray detector 4 move around the object 5 in each case so that the x-ray emitter 3 and the x-ray detector 4 are opposite one another on opposing sides of the object 13.

In normal radiography or fluoroscopy by such an x-ray diagnostic device, the medical two-dimensional (2D) data of the x-ray image detector 4 might be buffered in the image system 8 and subsequently reproduced on the monitor 9.

Flat-panel x-ray detectors may be used for full coverage in many areas of medical x-ray diagnostics and intervention, (e.g., in radiography, interventional radiology, or cardio angiography), but also therapy for imaging as part of the checking and radiation planning or mammography.

Current flat-panel x-ray detectors may be integrating detectors and are based primarily on scintillators, of which the light is converted in matrixes of photodiodes into electrical charge. These may be read out via active control elements row-by-row.

Figure 3:
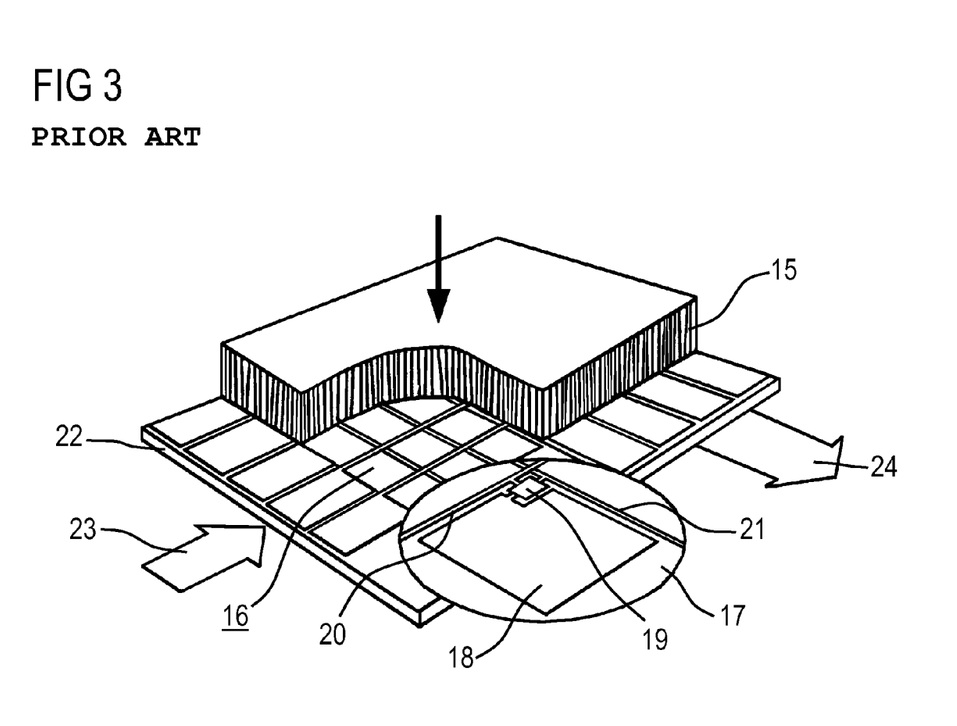
FIG. 3 depicts a schematic structure of an embodiment of an indirect-converting x-ray image detector.

FIG. 3 depicts the basic structure of an embodiment of an indirect converting x-ray flat-panel detector 4 used, including a scintillator (CsI) and active read-out matrix (photodiode and (TFT) switching element) in a perspective cross-section. The core components of the x-ray image detector 4 include a solid-state pixel matrix, row drivers and amplifiers, as is described for example in "Flat detectors and their clinical applications" by Martin Spahn, Eur Radiol. (2005), Vol. 15, pages 1934 to 1947. The solid-state pixel matrix may have a layer with a scintillator 15, including cesium iodide (CsI) for example, which on irradiation by x-ray radiation, feeds visible photons into a pixel matrix 16 of amorphous silicon (aSi), that produce a visible x-ray image. Each of the plurality of pixels or image points of this pixel matrix 16 includes, as is depicted enlarged in FIG. 3, of a pixel element 17 with a photodiode 18 and a switch 19, which is connected to row lines 20 and column lines 21. The pixel matrix 16 is applied to a glass substrate 22.

All pixel elements of a row are addressed and read out at the same time by the activation electronics 23 in each case. In the simplest case, an image is read out progressively row-by-row. The signals are fed via readout electronics 24 to the processing circuit 11 disposed in the imaging system 8, for example, in which the signals are processed in parallel in a plurality of amplifiers, merged by multiplexers and converted in an analog/digital converter (A/D converter) into a digital output signal for further digital processing.

Depending on the beam quality, the quantum efficiency for a scintillator made of CsI with a layer thickness of, e.g., 600 μm is between around 50% and 80%. The local-frequency dependent DQE(f) ("detective quantum efficiency") is limited upwards by this and for pixel sizes, (e.g., 150 μm to 200 μm) and for the local frequencies of 1 to 2 lp/mm of interest for the applications lies well below this figure. To make new clinical applications possible, (e.g., dual-energy, spectral imaging, material separation), but also to further increase the quantum efficiency, the potential of counting detectors for energy-discriminating counting detectors mainly based on direct-converting materials such as CdTe or CdZnTe (CZT) and contacted ASICs (application specific integrated circuits; e.g., implemented in CMOS technology) are increasingly being investigated.

Figure 4:
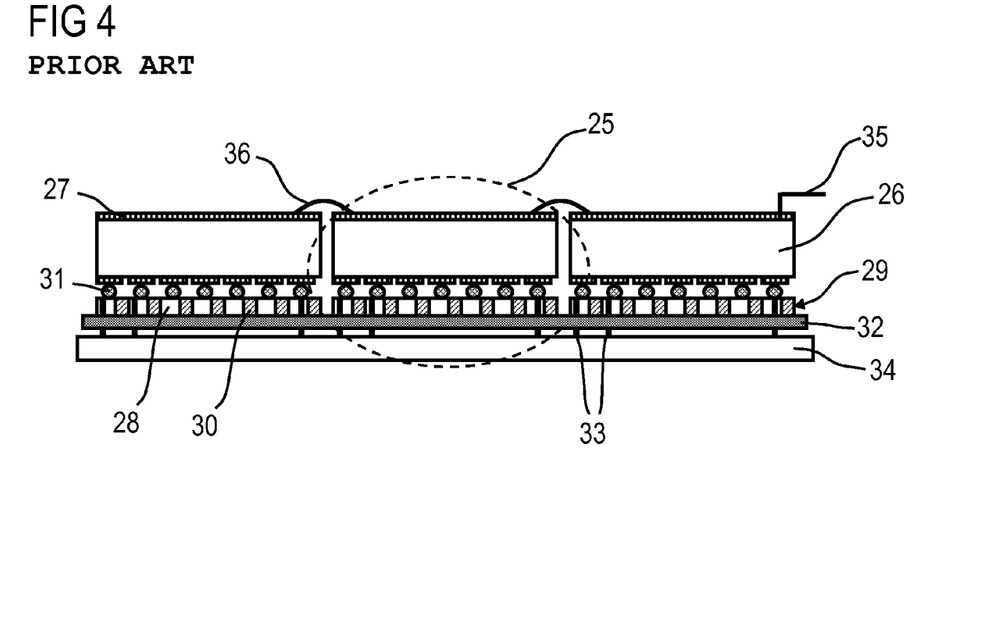
FIG. 4 depicts a side view of a schematic diagram of an embodiment of a direct-converting, counting x-ray image detector.

The principal structure of such counting x-ray image detectors 4 is depicted in FIG. 4, which depicts a schematic diagram of a side view of a direct-converting, counting x-ray image detector 4 including a number of detector modules 25. Each detector module 25 includes a flat direct converter 26, (e.g., CdTe or CZT), which converts the x-ray radiation and separates the created charge carrier pairs via an electrical field that is created by a common top electrode 27 (e.g., cathode) and a pixel electrode 28 (e.g., anode). The charging creates a charge pulse in one of the pixel electrodes 28 of a (e.g., pixelated) ASIC 29 designed in pixel form, the height of which corresponds to the energy of the incident x-ray quantum and which, if lying above a defined threshold value, is registered as a counter event. The threshold value serves to distinguish an actual event from electronic noise or, e.g., also to suppress k fluorescence photons, in order to distinguish multiple counting. Disposed between the pixel electrodes 28 of the ASIC 29 in each case is pixel electronics 30, which provides at least one pulse shaper, comparator, counter, and switching electronics for the readout process, as will be to some extent explained in greater detail below. The ASIC 29, a corresponding section of the direct converter 26 and a coupling between direct converter 26 and ASIC 29 (for direct converting detectors, e.g., by contacts 31 known as bump bonds) each form the detector module 25 with a plurality of pixel elements 17. The ASIC 29 is disposed on a substrate 32 and connected, for example, by TSV connections 33 (e.g., through silicon via) to peripheral electronics 34. A detector module 25, if required, may also have one or more ASICs 29 and one or more parts sections of the direct converter 26. A high voltage connection 35 is routed to the common top electrode 27. The top electrodes 27 of the detector module 25 as well as if necessary the parts sections of the direct converter 26 are in contact via high voltage connections 36. The peripheral electronics 34 is connected to at least one tile, a detector module 25, or, in certain embodiments, to a number of tiles or detector modules 25.

Figure 5:
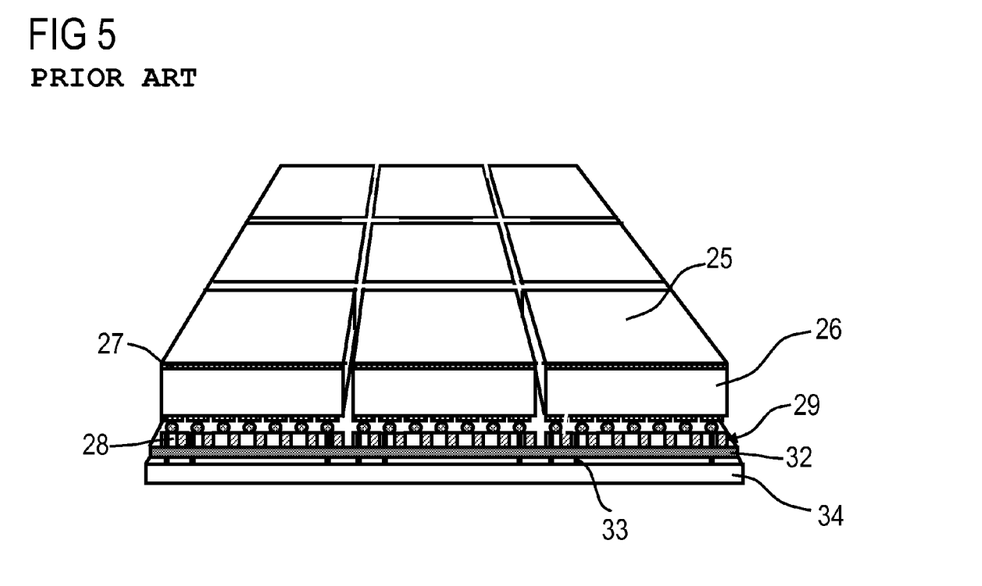
FIG. 5 depicts a three-dimensional view of an embodiment of a counting x-ray image detector including a number of detector modules.

FIG. 5 depicts a three-dimensional view of such a structure. For large-area x-ray image detectors 4 (e.g., 20×30 cm²), a number of detector modules 25 each of 2×2 cm² surface area, for example, are connected together (e.g., 10×15 of such detector modules 25 would thus be provided) and linked via the common peripheral electronics 34. The connection between the ASIC disposed on the substrate 32 and the pixel electrodes 28 and the pixel electronics 30 and the peripheral electronics 34 are made by the TSV connections 33 (e.g., through silicon via).

Figure 6:
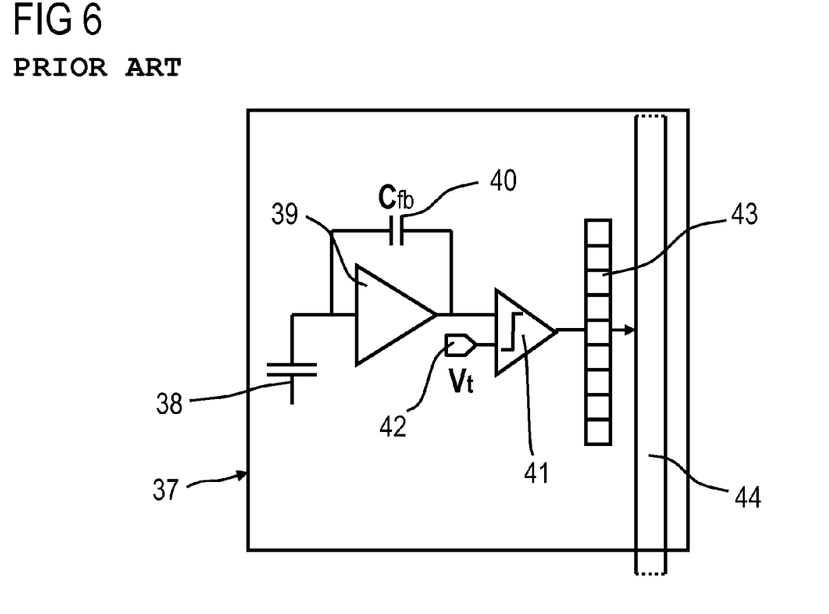
FIG. 6 depicts a diagram of an embodiment of central functional elements of a counting pixel element of an x-ray detector.

FIG. 6 depicts the schematic layout of a counting pixel element 37. It may include the detector input, a preamplifier, a pulse shaper, a discriminator of which the threshold $V_t$ may be configured, a counter, and an activation and readout unit. The electrical charge passes through the charge or signal input 38 as detector input. The electrical charge is collected in the pixel element 37 and is amplified there with the aid of a charge amplifier 39 and a feedback capacitor 40. In addition, at the output, the pulse shape may be configured in a shaper or filter. An event is counted when the output signal lies above an adjustable threshold. This is established via a discriminator 41. The threshold may, in principle, also be predetermined in a similar way as a fixed value by a threshold generator 42, but may be applied via a digital-to-analog converter (D/A converter, DAC) and is thus variably adjustable in a certain range. If the threshold is exceeded a digital counter 43 is incremented by one. Subsequently, the value may be read out via readout logic 44.

Figure 7:
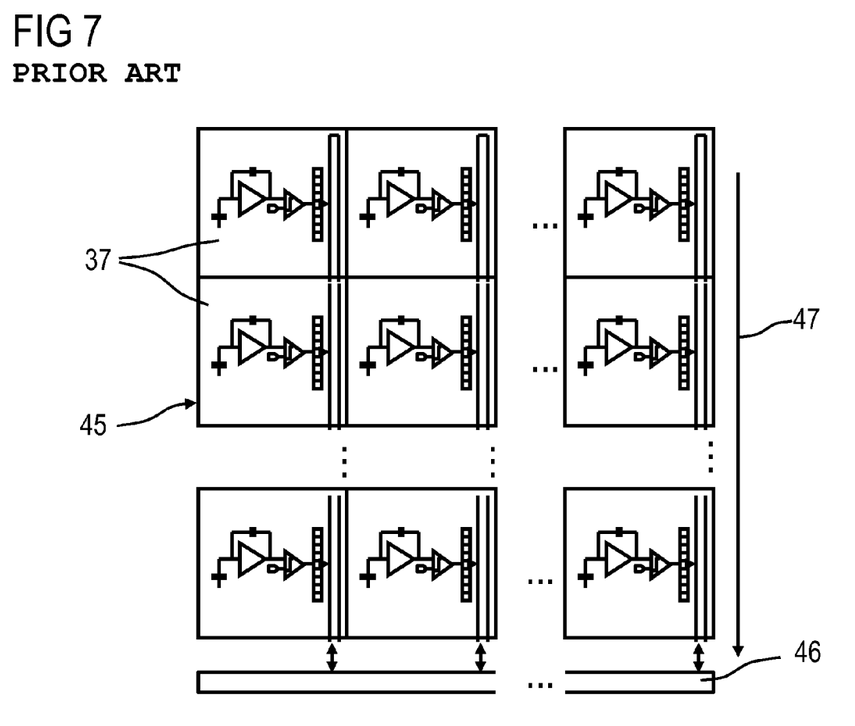
FIG. 7 depicts a schematic diagram of an embodiment of an entire ASIC module or array of counting pixel elements of an x-ray detector with control and readout logic.

FIG. 7 depicts a corresponding schematic section of an ASIC module or array 45 of counting pixel elements 37, e.g., 100×100 pixel elements 37 each with an edge length of 180 μm, for example. Such an array 45 is realized with the aid of the ASIC 29. In this example, for a detector module 25, this would produce a size of 1.8×1.8 cm². For larger x-ray image detectors 4 (e.g., 20×30 cm²), a number of detector modules 25 are combined (e.g., 11×17 detector modules 25 would produce approximately this surface area) and connected via a common peripheral control and readout unit 46 that implements a readout 47.

In the case of counting and energy-discriminating x-ray detectors, two, three, or more thresholds are introduced and the level of the charge pulse, corresponding to the predefined thresholds (e.g., discriminator thresholds), are arranged in one or more of the digital counters. The x-ray quanta counted in a specific energy range are able to be obtained by differentiating the counter contents of two corresponding counters. The discriminators are able to be set with the aid of the threshold generator for the entire detector module or pixel-by-pixel within given limits or ranges. The counter contents of the pixel elements are read out one after the other via a corresponding readout facility. This readout process requires a certain time during which the count may not continue without errors.

Figure 8:
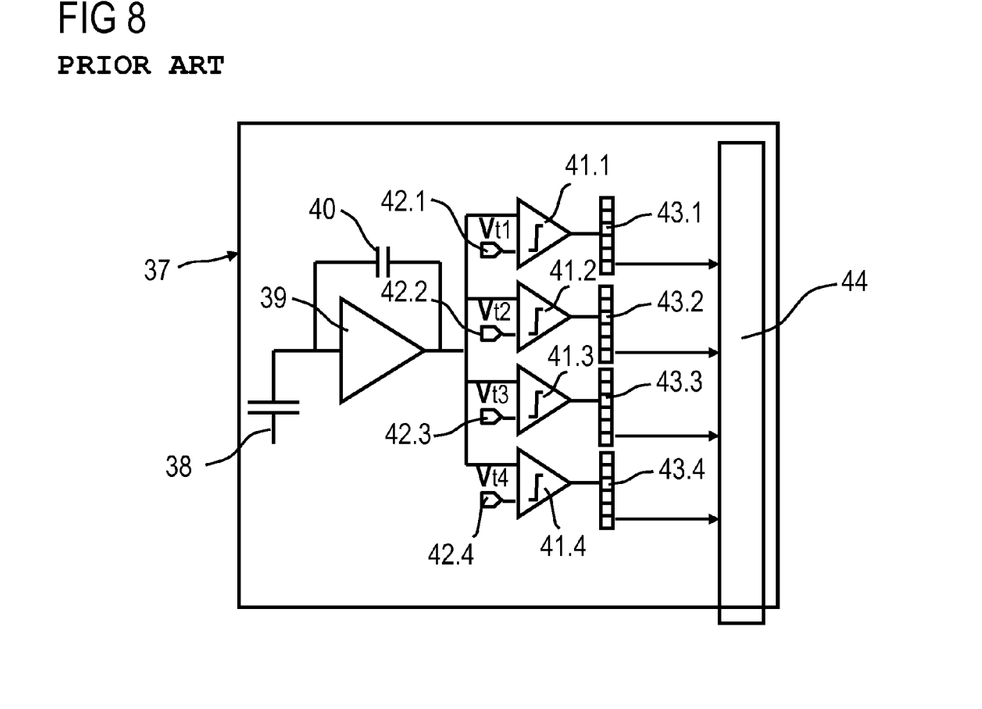
FIG. 8 depicts a diagram of an embodiment of central functional elements of a counting pixel element of an x-ray detector with a number of discriminators and counters.

FIG. 8 depicts a further example for the central function elements of a counting pixel element 37 of a digital x-ray image detector 4 with energy-discriminating pixel design. In this example, the pixel element 37 has several, (e.g. four), discriminators 41.1, 41.2, 41.3 and 41.4 each with a threshold generator 42.1, 42.2, 42.3 and 42.4 with different thresholds, to which digital counters 43.1, 43.2, 43.3, 43.4 are connected.

Such a structure with the use of different discriminator thresholds provides an energy-selective and energy-discriminating imaging to be performed.

Different effects may now lead to an absorbed x-ray quantum not only depositing its energy in one pixel element 37 but, through processes such as charge sharing or fluorescence photons (k-fluorescence), to a part of the energy being deposited in the neighboring pixel elements 37. This is depicted schematically in FIG. 9, on the basis of which the circumstances during x-ray imaging will now be described in greater detail.

Figure 9:
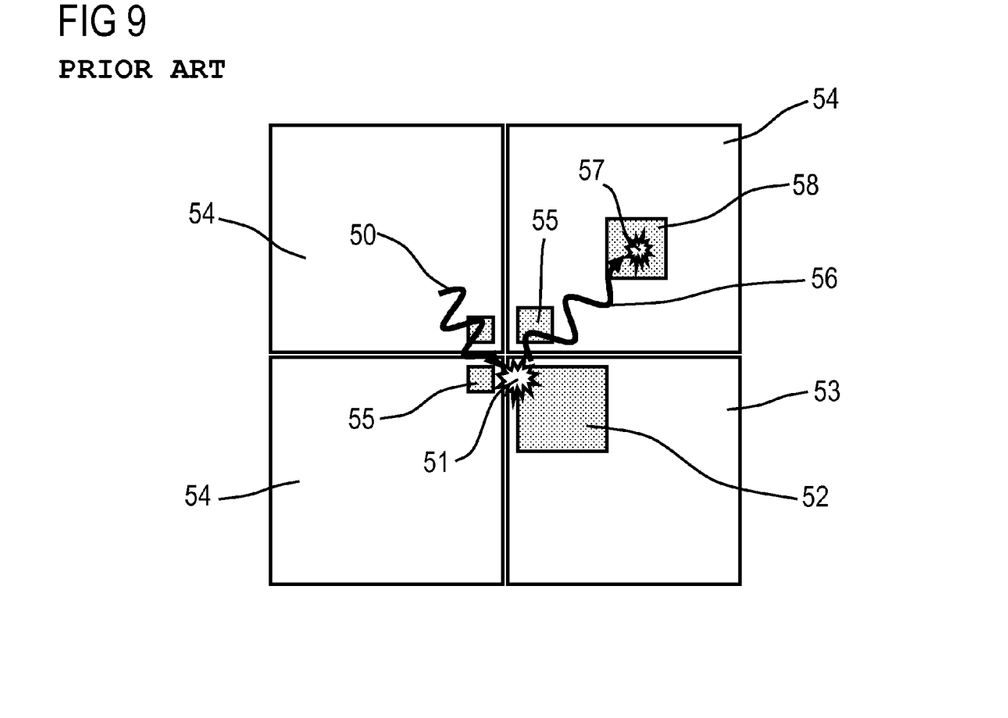
FIG. 9 depicts a diagram of circumstances during x-ray imaging for four neighboring pixel elements.

A primary x-ray quantum 50 falling on the x-ray image detector 4 creates a primary event 51 in the direct converter 26, which leads to a signal portion 52 at the primary location in a first pixel element 53. Through charge sharing, further signal portions 55 arise in the neighboring pixel elements 54. A fluorescence photon 56 may also be triggered by the primary event 51, which leads to a secondary event 57 in a direct converter 26 assigned to a neighboring pixel element 54, which results in a signal portion 58 through fluorescence photons 56 in the neighboring pixel element 54. This may lead to miscounting, for example to multiple counting or to no counting at all, if the respective deposited energies lie below the thresholds. The energy may also be incorrectly assigned in the case of energy-discriminating counting detectors.

SUMMARY AND DESCRIPTION

The scope of the present invention is defined solely by the appended claims and is not affected to any degree by the statements within this summary. The present embodiments may obviate one or more of the drawbacks or limitations in the related art.

The underlying object is to embody a counting digital x-ray image detector of the type described above such that, using similar hardware, the x-ray image detector 4 may be operated to switch between two modes, a high-resolution mode for the largest signal as well as a low-resolution mode for spectral imaging.

The object is achieved for a counting x-ray image detector in a high-resolution first pure counting mode, the sum signals at different crossing points of neighboring pixel elements being determined and the sum signal being assigned to that pixel element that has the largest individual signal. In a low-resolution energy-discriminating second counting mode, a number of pixel elements being connected together into a pixel structure so that a sum signal is formed in the pixel elements that is compared with thresholds of the conversion facility of the pixel elements, and that the counter states are evaluated as a function of the comparisons such that only the pixel element, of which the conversion facility is assigned the threshold value corresponding to the maximum input signal of the pixel structure, delivers a value.

By variable use of the pixel counters with high-resolution pure counting mode and very low or low-resolution energy-discriminating counting mode for maximizing the counting rate, the x-ray image detector is able to be used in different modes and thus in a targeted way for different clinical requirements.

In certain embodiments, the point assigned to one of these pixel elements of the pixel structure may be the crossing point of the pixel elements.

The pixel structure may be formed by a locally fixed 2-type cluster of 2×2 counting pixel elements.

In one embodiment, the conversion facility for converting the electrical signal into a count signal may have at least one discriminator and at least one threshold generator.

Spectral imaging is possible in high-resolution mode if each counting pixel element has a number of discriminators and a number of threshold generators. In the low-resolution case 4 times the number, e.g., very finely divided spectral imaging, is possible.

The second counting mode for a logic may cause only that counter of the discriminators belonging to the pixel elements of the pixel structures that has the largest threshold, which is still exceeded by the signal, to be increased by one. For example, the following may apply: $T(D_1)<T(D_2)<T(D_3)<T(D_4)$, wherein $D_1$ to $D_4$ describe the four discriminators of the collected 2×2 pixels and $T(D_n)$ describes the respective threshold. If, for example, $T(D_3)<S<T(D_4)$ applies for the sum signal, then only counter 3 is increased by one, but none of the others.

As an alternative, in the second counting mode the counter state of each counter may be increased by one if the signal lies above the threshold of the discriminators and that, by subtraction of the counter states of the counters, the number of the x-ray quanta occurring for each of the energy intervals is determined. After the reading-out of the count values, for example, the number of the x-ray quanta occurring for each of the energy intervals may be determined offline.

In certain embodiments, the x-ray image detector may have at least one ASIC.

The signal level is able to be assigned uniquely to one of the counters belonging to the discriminators if the discriminators are embodied as window discriminators.

In certain embodiments, each first memory unit may be assigned precisely one second digital memory unit for storage by a transmission process of a copy of the first memory unit at the point in time of the transmission.

DETAILED DESCRIPTION

Figure 10:
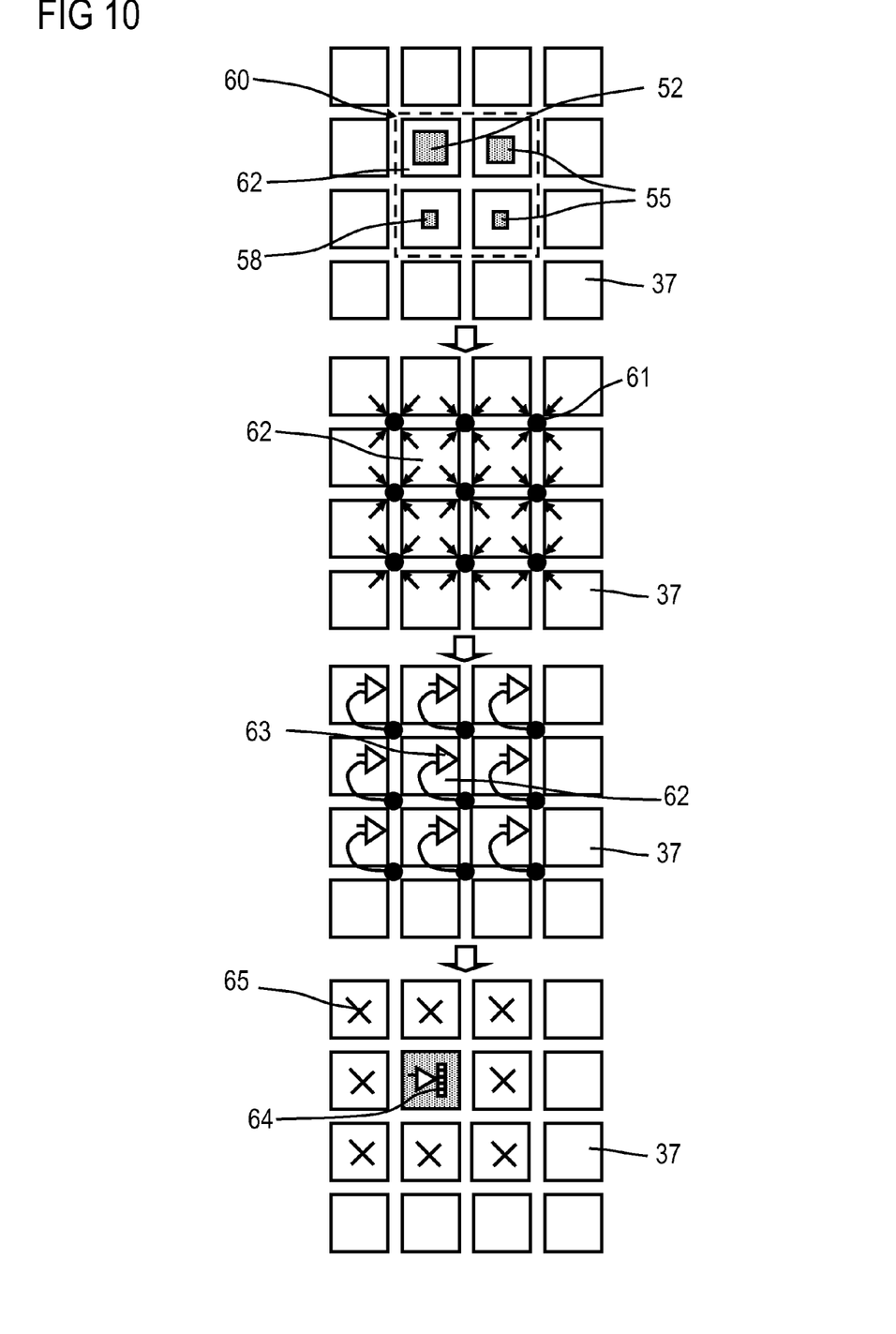
FIG. 10 depicts a schematic diagram of an embodiment of a first mode in which an anticoincidence and summation logic, via neighboring pixel elements, defines that pixel element in the direct environment that has the largest signal.

With reference to FIG. 10, a first embodiment of the x-ray image detector 4 will now be explained. In a 4-type matrix 60 of 4×4 counting pixel elements 37, signal portions 52, 55, and 58 are created by a primary event and/or secondary event. At crossing points 61, the signal portions of a 4-type matrix in each case are collected into a sum signal and the sum signal is assigned to precisely that pixel element 62 that had the largest individual signal, the signal portion 52 of the primary event 51. If the sum signal exceeds the threshold $V_t$ of the discriminator 63, under the control of the readout logic 44, the counter 64 of only this pixel element 62 is increased by one while the other counters are suppressed, as is symbolized by crosses 65.

Thus, the sum signals are determined for example at the different crossing points 61 of each four neighboring pixel elements of the 4-type matrix. Additionally, the sum signal is assigned to precisely that pixel element 62 that had the largest individual signal, if the sum signal lies above the predetermined threshold, e.g., the pixel location of the largest individual signal reflects the location of the maximum of the signal. This is an anticoincidence and summation logic via neighboring pixels for the first mode.

Figure 11:
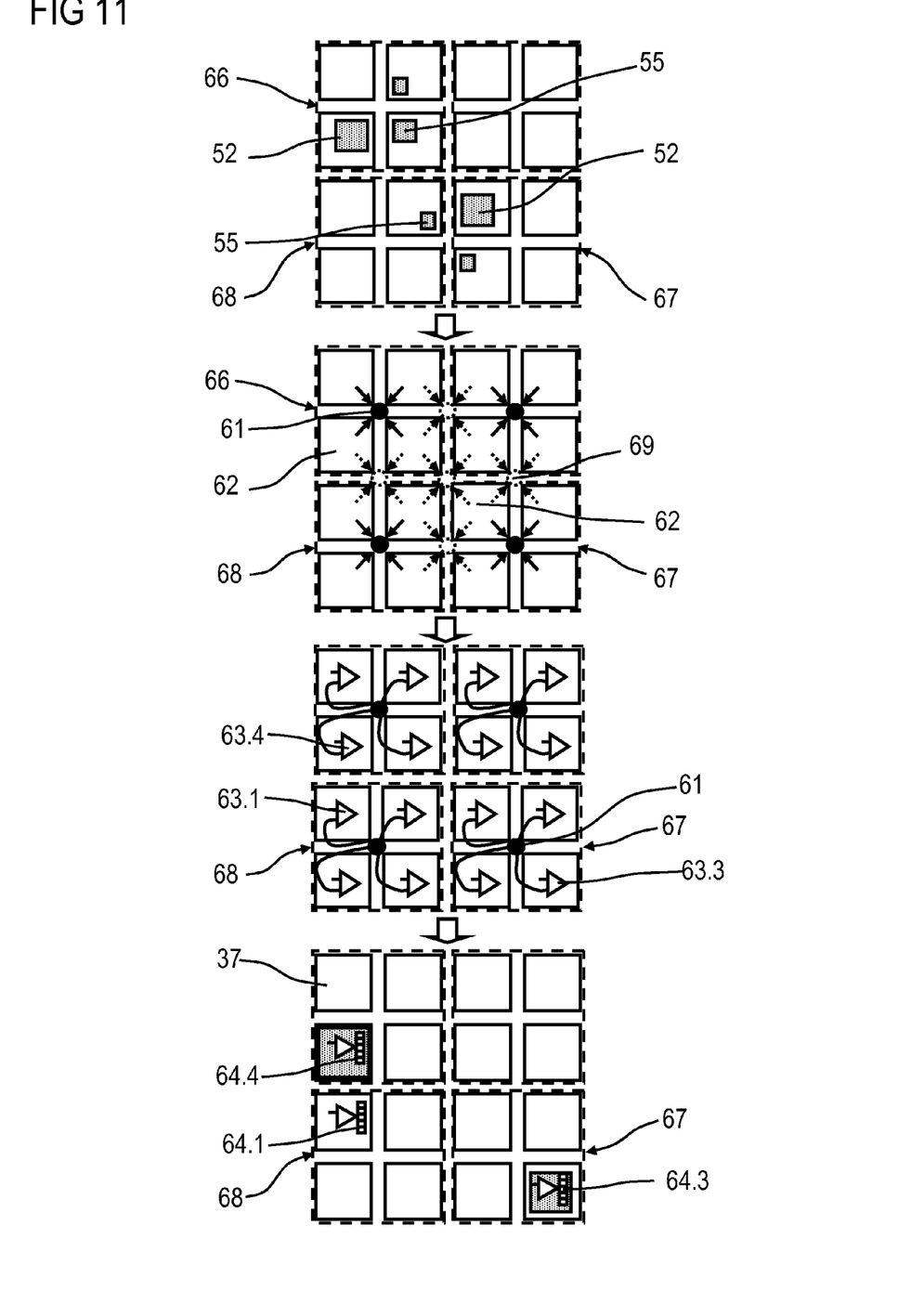
FIG. 11 depicts a schematic diagram of an embodiment of a second mode in which the summation is carried out in collected pixel structures and the signal sum is fed to discriminators with different thresholds.

With reference to FIG. 11, a second mode of the x-ray image detector 4 will now be described, in which the x-ray image detector 4 may be switched over. In the 4-type matrix 60, 2-type clusters 66 to 68 of 2×2 counting pixel elements 37 are predetermined locally fixed. In the example depicted, signal portions 52, 55, and 58 are created by two primary events and/or secondary events. At the crossing points 61 of the 2-type clusters 66 to 68 or a position that is assigned to these four counting pixel elements 37 of the 2-type clusters 66 to 68, (since from the ASIC layout this point, where possible, does not have to lie exactly symmetrically in the center of the four pixel elements), first sum signals are again formed. The crossing points lying at the touching corners and edges of the 2-type clusters 66 to 68, (e.g., outside the 2-type clusters 66 to 68), are deactivated in this mode, as is indicated by the dashed outline.

The sum signal is then compared with the four different thresholds $V_t(i)$, i=1,4, of the four discriminators 63 of the four pixel elements 37, wherein there are three options for evaluation.

In one option, provided the discriminators 63 are what are referred to as window discriminators, which thus have both an upper threshold and also a lower threshold, precisely that counter 64 of one of the pixels i=1,4 is assigned for which $V_{t\_low}(i) \leq S < V_{t\_high}(i)$ applies, then the following would apply:

$$V_{t\_low}(1) < V_{t\_high}(1) = V_{t\_low}(2) < V_{t\_high}(2) = V_{t\_low}(3) < V_{t\_high}(3) = V_{t\_low}(4) < V_{t\_high}(4).$$

$V_{t\_high}(4)$ is expediently set so that this corresponds to the highest expected x-ray energy that is defined by the peak voltage of the generator kVp. The indexing within the four pixel elements 37 may naturally be different, This basically also applies to the other approaches. The "logic" is however expediently the same for all pixel elements 37.

In a second option, all counters 64 of the pixels i=1,4 are assigned a count for which the following applies: S>T(i). This may be the case if the discriminators only possess a lower threshold T_low(i). The energy bins are then "reconstructed" later (e.g., after reading out the counters) from the counter states N(1) to N(4) by differentiation. If, for example, $T(D_1) < T(D_2) < T(D_3) < T(D_4)$ applies, wherein $D_1$ to $D_4$ describes the four discriminators of the collected 2×2 pixels and $T(D_n)$ the respective threshold. Then, the number of events in the lowest energy bin is produced, e.g., with energies between $T(D_1)$ and $T(D_2)$ through N(1)-N(2), for the next energy bin by N(2)-N(3), ..., and for the topmost bin by N(4). This has no limitation upwards, but may be defined by the highest energy present in the x-ray spectrum.

In a third option, a logic causes only the counter 64 to be incremented for which the sum signal has exceeded the largest of the four thresholds $V_t(i)$, in the case of noise, e.g., also none. Differentiation as above is then not necessary.

In all these cases, the location is no longer relevant since four neighboring pixel elements 37 are collected together and the four discriminators 63 in the 2×2 environment, the 2-type clusters 66, are used for the spectral imaging at the expense of the local resolution.

Thus, in a second mode, within 2×2 pixel elements 37, that pixel element 37 is determined of which the discriminator 63 is assigned to the threshold $V_t(i)$ corresponding to the maximum input signal of the four-type group, of the 2-type cluster 66. Only the counter state of its counter 64 is increased by one. This provides that the pixel location of the largest individual signal does not have to correspond to the location of the maximum at which counting is undertaken, as is evident for the second 2-type cluster 68.

Referring to the example depicted, it emerges that in the first 2-type cluster 66 the signal sum lies above the threshold of the discriminator 63.4, in the second 2-type cluster 67 the signal sum lies above the threshold of the discriminator 63.3 but below the threshold of the discriminator 63.4 and in the third 2-type cluster 68 the signal sum lies below the threshold of the discriminator 63.1. Therefore, the corresponding counters 64.3 and 64.4 will be incremented by one, as is intended to be symbolized by the dark marking. The counter 64.1 belonging to the discriminator 63.1 is not changed however, the signal sum lies below the threshold. This signals the absence of filling. This is a very low or low-resolution energy-discriminating count mode for maximizing the count rate or suppressing the anticoincidence and energy summation.

FIG. 11 depicts examples of two primary events 51, which lead to two signal portions 52 at the primary location and signal portions 55 through charge sharing. In the first case, at the top left, all signal portions 52 and 55 lie in the first 2-type cluster 66. In the second case, at the bottom right by contrast, as well as the 2-type cluster 67, the third 2-type cluster 88 is also involved through crosstalk. But the crosstalk stays within bounds because of the comparatively significantly larger surface of the 2-type clusters 66 to 68 compared to that of the pixel elements 37, so that in many cases the signal portion 55 falls, through charge sharing as described above, below the lowest threshold and is thus not counted. If, by contrast, the signal portion 55 may exceed the threshold of the discriminator 63.1, this leads in the associated counters 64.1 to a miscounting, which however does not influence the overall result or only influences it insignificantly.

Figure 12:
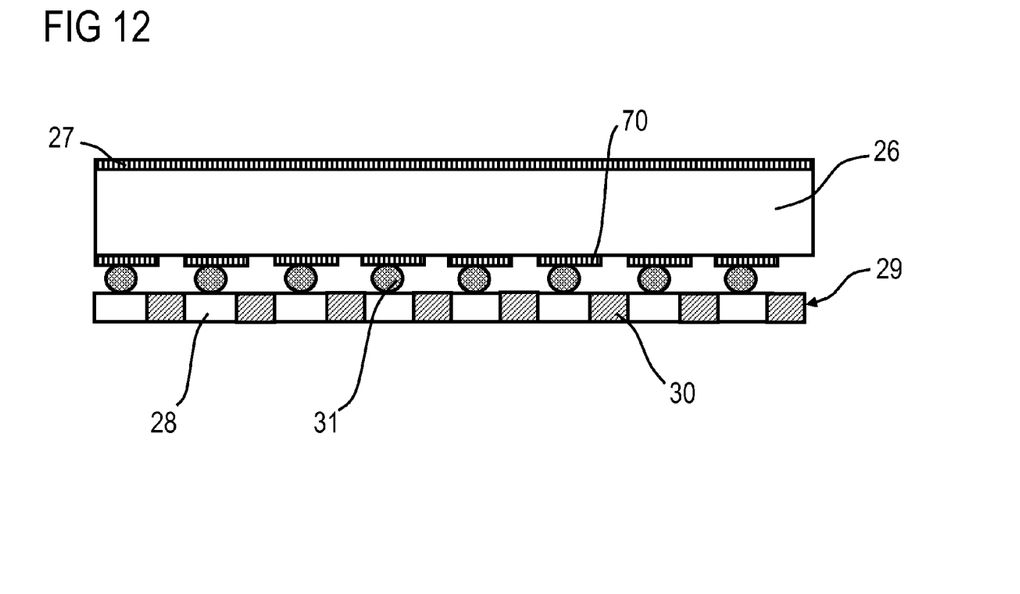
FIG. 12 depicts an embodiment of a hardware configuration for the first mode.
Figure 13:
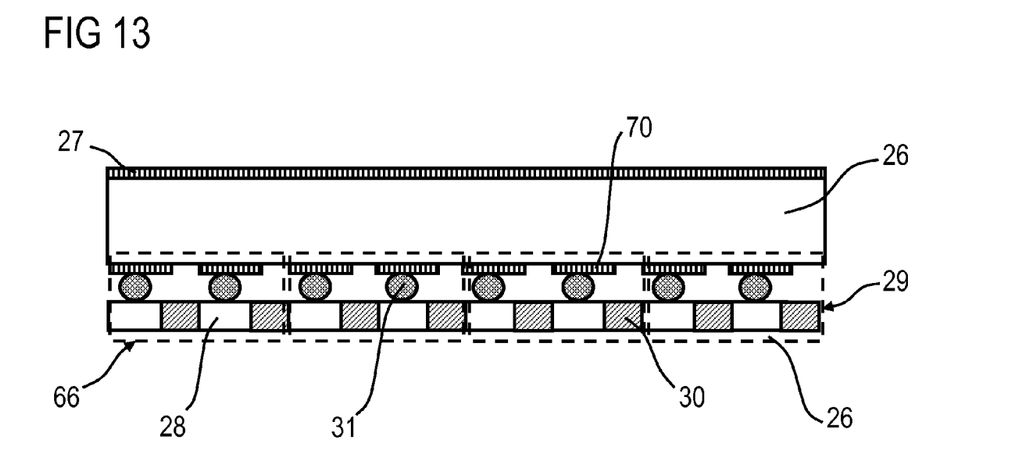
FIG. 13 depicts an embodiment of a hardware configuration for the second mode.

With reference to FIGS. 12 and 13, the difference between the two modes will now be explained. In both FIGS. 12 and 13, a detector module 25 with the flat direct converter 26, the common top electrode 27 as cathode and pixel electrodes 28 as anode of the (e.g., pixelated) ASIC 29 with the pixel electronics 30 are depicted. The hardware configuration for the two modes is the same, e.g., each pixel element of the ASIC 29 is connected via contacts 31 (e.g., bump bonds) to electrodes 70 of the direct converter 26.

FIG. 12 depicts the high-resolution mode in respect of local resolution in which anticoincidence and summation are switched on. In FIG. 13 by contrast the second mode with the binning (e.g., 2×2) of pixel elements 37 to a 2-type cluster 66 is depicted, wherein in each case the overall signal of the four pixel elements 37 is summed and fed to the discriminators of the four pixel elements 37 for comparison with the thresholds, as has already been described with reference to FIG. 11. The other local dimension or the associated pixel elements 37 in the 2×2 configuration of the two-type cluster 66 respectively.

It is to be noted in this case that on the ASIC 29 side each pixel element 37 needs a surface or an area in order to accommodate the contacts 31. These are the pixel electrodes 28. In addition a further area is necessary to accommodate the remaining (e.g., intelligent) part of the pixel element 37 that is needed for the pixel electronics 30, the analog and digital electronics for example with preamplifiers, shapers, discriminators, counters and readout logic.

As regards the respective surfaces, there are only dependencies under some condition. For one, the size of the electrodes 70 on the direct converter 26 side on the one hand depends on the physical circumstances such as charge collection, desired capacitance and others, but on the other hand also on connection technologies and however is naturally smaller than the pixel pitch. Additionally, the size of the contacts 31 (e.g., bump bonds) is technology-dependent and is naturally also smaller than the pixel pitch. The "round" shape depicted is an abstraction here. In reality, the contacts 31 are embodied differently since the bumps are connected on both sides by a soldering process in each case. Further, on the ASIC 29 side the connection point with the contact 31 (e.g., bump bond), the so-called pad, is a part of the pixel surface and is expediently kept only as large as is necessary, since the greatest possible space is available for the analog and digital electronics. Depending on pixel size, design complexity, etc., the ASIC pad may make up a greater proportion of the pixel surface than the electronics part but also vice versa. The pad on the ASIC 29 side does not have to have the same size as the pad on the detector material side. The areas of connection technology and fabrication accuracy have a role to play in the size of the pad.

Figure 14:
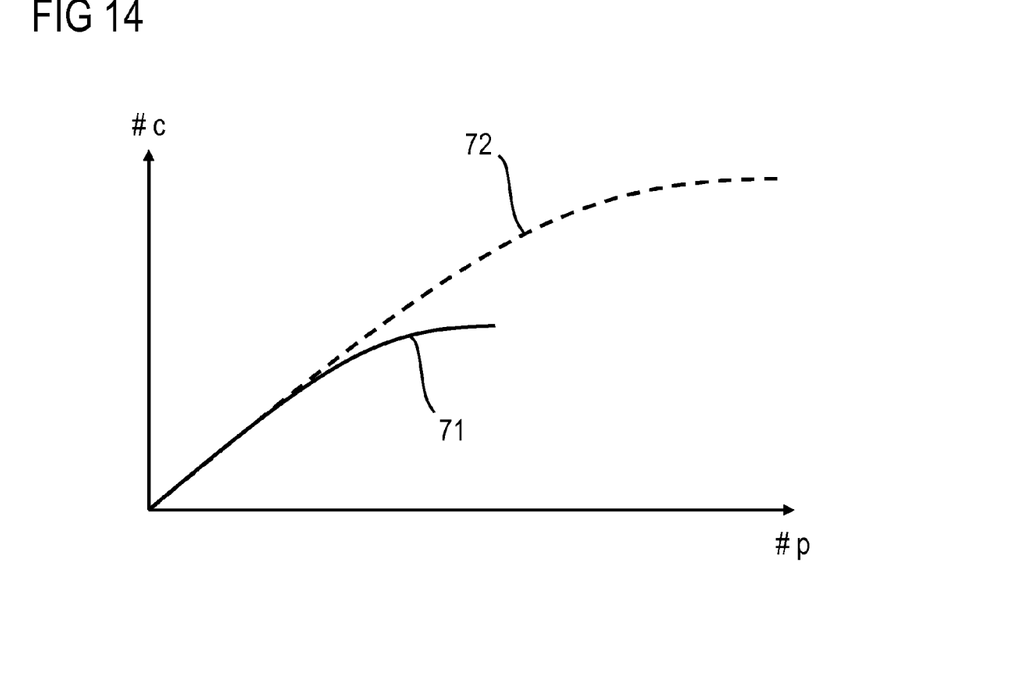
FIG. 14 depicts an embodiment of counting rate behavior for the case of a pixel design with summation and anticoincidence.

FIG. 14 now illustrates the count rate behavior for the case of a pixel design with summation and anticoincidence as a first curve 71 and the case of the pixel design without this capability or device as a second curve 72. In this count rate behavior the number of count pulses of the events has been plotted against the number of incident x-ray photons.

Figure 15:
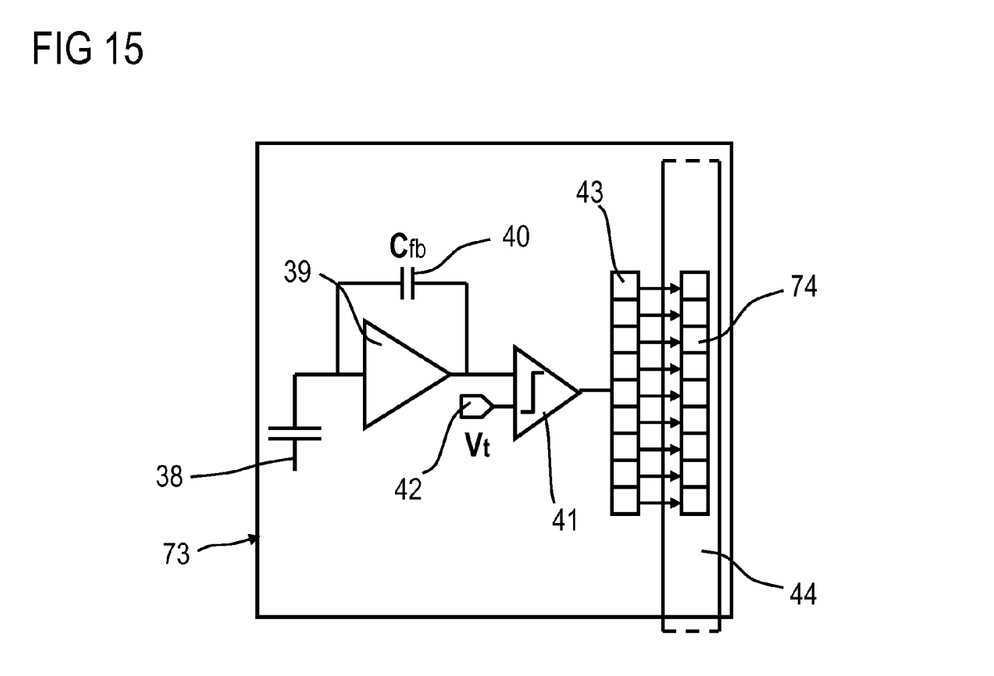
FIG. 15 depicts a schematic diagram of an embodiment of a counting pixel element with an additional associated counter.

FIG. 15 depicts a schematic diagram of a counting pixel element 73 with an additional associated counter, a shadow register, or shadow memory 74 in order to implement a fast transfer and to minimize the detector dead time.

In order to resolve the problem described above of miscounting, multiple counting, or even no counting when the respective deposited energies lie below the thresholds or incorrect assignment of the energy in the case of energy-discriminating, counting detectors, summation, and anticoincidence circuits are used in which the deposited charge in neighboring pixels within a given time (e.g., coincidence) is summed, assigned to a specific pixel element, and the sum signal is compared to the threshold of a discriminator or a number of discriminators. One of the possible implementations is depicted schematically in FIG. 10. Other realization options, for energy summation, anticoincidence, and the assignment to a pixel or the pixel that has seen the greatest part signal, are possible.

A potential disadvantage of this function is however that through this a greater surface than that of the pixel element is inactive at this time and this leads with high fluxes significantly earlier, e.g., already with lower x-ray fluxes or for non-paralyzing pixel designs, to the occurrence of non-linearities than would be the case without such a summation and anticoincidence circuit. If the eight neighboring pixel elements are considered, then the paralysis or the non-linearity occurs already with an x-ray flux that is smaller by an order of magnitude, as may be seen from FIG. 14. In particular, with diagnostic x-ray doses the x-ray flux might prevent the use of summation and anticoincidence circuits.

But, now the spectral information is particularly of interest for diagnostic clinical applications, e.g., also for the spectral 3D reconstructions (e.g., flat-panel cone-beam CT). On the other hand, the requirement for local resolution is frequently not so high in these applications.

The basic idea is now, for cases with high fluxes, to avoid the paralysis case or the occurrence of non-linearity. The pixel design is therefore designed so that for the high-resolution (and "low-flux") case, it uses the anticoincidence and summation capability and also allows the assignment to that pixel element with the largest signal and thus the high local resolution.

For the low-resolution (and "high flux") case, the summation over neighboring pixel elements is used but not the anticoincidence, e.g., here the pixel elements are binned (e.g., collected). On account of the greater local extent, charge sharing or energy transport into neighboring detector ranges via fluorescence photons is no longer of such great consequence. In addition, 4 times the number of discriminators and corresponding counters are available for the collected pixel element (e.g., 2×2), which with corresponding threshold settings would allow spectral imaging. This is depicted in FIG. 11. In order to provide that at the end there is only one count per energy bin, a number of options are conceivable. For example, either (1) the discriminators are designed as window discriminators, so that the signal level may be assigned uniquely to a counter belonging to one of these discriminators D1 to D4 (63.1 to 63.4), or (2) a logic makes sure that only that counter that has the greatest threshold that is still exceeded by the signal of the discriminators D1 to D4 belonging to the 2×2 pixel elements is increased by one. For example, the following may apply: T(D1)<T(D2)<T(D3)<T(D4). If the following applies for the sum signal S, e.g. T(D3)<S<T(D4), then only counter 3 is increased by one but none of the others.

Alternatively, each counter is increased by one if the signal lies above the discriminator threshold. Then, after readout of the count values, the number of the x-ray quanta occurring for each of the energy intervals would have to be determined offline by subtraction.

The decisive factor in the structure in this case is that, unlike in the other approaches, the same hardware is used. For example, both modes (high-resolution with summation/anticoincidence/assignment to pixel element, e.g., with largest signal and also low-resolution summation/binning/spectral imaging) may be carried out with the same hardware. Therefore, each pixel element of the ASIC 29 is connected to the corresponding electrodes 70 of the detector module 26 via the bump bonds 31 (see also FIGS. 12 and 13). This provides the x-ray image detector 4 to be used in a targeted way in different modes and thus for different clinical requirements.

An expansion may be designed such that each pixel element already has two (or more) discriminators, e.g., spectral imaging is already possible in high-resolution mode. Thus, in the low-resolution case, 4 times the number, e.g., a very finely divided spectral imaging, is possible. For the case of, e.g., 2 discriminator/counter pairs per pixel, eight discriminator/counter pairs may be available for the 2×2 binned pixel element.

In addition, another solution may be used in which a further counter is present for each counter in the pixel element that however is only intended to support the function of fast readout, as is described in the older patent application DE 10 2012 212 124.2 (see also FIG. 15).

The pixel size provided lies between 100 µm and 200 µm, (e.g., at 160 µm). The 2×2 binned pixel element is then between 200 µm and 400 µm in size, (e.g., 320 µm). A further binning of, e.g., 4×4 may take place digitally.

The x-ray image detector 4 is designed such that it is able to be switched into two modes with the same hardware. This produces a variable usage of the pixel counters with high-resolution pure counting mode and very low-resolution energy-discriminating counting mode for maximizing the count rate.

In a first mode that pixel element 53 or 54 in a direct environment is determined that has the largest signal. Summation methods and assignment of the sum to that pixel element 53 that has the largest signal and incrementation of the corresponding counter 43 if the sum signal lies above the threshold value. At the same time, a further possible count value is suppressed in the directly neighboring pixel elements 54. Thus, initially the sum signals at the different crossing points 61 of each four neighboring pixel elements 53 and 54 are determined. Additionally, the sum signal is assigned precisely to that pixel element that had the largest individual signal, if the sum signal lies above the predetermined threshold.

FIG. 11 depicts a mode in that the summation is carried out in previously defined 2×2 pixel structures and the signal sum is fed to the four discriminators 41.1 to 41.4 with different thresholds. In that pixel element in which the signal matches the threshold condition, the corresponding counter 43.1 to 43.4 is incremented by one. In this example, the sum signal in the binned pixel element would be: (i) top left above the threshold of the discriminator 41.4, (ii) bottom right above the threshold of the discriminator 41.3, but below the threshold of the discriminator 41.4, and (iii) bottom left below the threshold of the discriminator 41.1.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A counting digital x-ray image detector for recording x-ray images of an object irradiated by x-ray radiation with at least one detector module, the x-ray image detector comprising:
   a flat direct converter configured to convert x-ray radiation into an electrical signal and a matrix with a plurality of counting pixel elements, wherein each counting pixel element comprises a charge or signal input;
   a conversion facility configured to convert the electrical signal into a count signal;
   a digital counter configured to detect and store the count signal; and
   a control and readout unit,
   wherein the x-ray image detector is configured such that each pixel element of the x-ray image detector is connected to corresponding electrodes of detector material of the flat direct converter via contacts,
   wherein the x-ray image detector is configured to be switched over, such that (1) in a first count mode, the sum signals at different crossing points of neighboring pixel elements are determined and the sum signal is assigned to the pixel element having the largest individual signal, and (2) in a second count mode, a number of pixel elements are connected together to form a pixel structure, wherein a sum signal is formed in the pixel elements that is compared to thresholds of the conversion facility of the pixel elements, and counter states are evaluated as a function of the comparison such that only the pixel element, of which the conversion facility is assigned to the threshold corresponding to the maximum input signal of the pixel structure, delivers a value.

2. The x-ray image detector as claimed in claim 1, wherein a point assigned to one of these pixel elements of the pixel structure is the crossing point of the pixel elements.

3. The x-ray image detector as claimed in claim 2, wherein the pixel structure is formed by a locally fixed 2-type cluster of 2×2 counting pixel elements.

4. The x-ray image detector as claimed in claim 3, wherein the conversion facility for converting the electrical signal into a count signal comprises at least one discriminator and at least one threshold generator.

5. The x-ray image detector as claimed in claim 4, wherein the x-ray image detector comprises at least one application specific integrated circuit (ASIC).

6. The x-ray image detector as claimed in claim 2, wherein each first memory unit is assigned precisely one second digital memory unit for storage through a transmission process of a copy of the first memory unit at the time of the transmission.

7. The x-ray image detector as claimed in claim 2, wherein the x-ray image detector comprises at least one application specific integrated circuit (ASIC).

8. The x-ray image detector as claimed in claim 1, wherein the pixel structure is formed by a locally fixed 2-type cluster of 2×2 counting pixel elements.

9. The x-ray image detector as claimed in claim 8, wherein the x-ray image detector comprises at least one application specific integrated circuit (ASIC).

10. The x-ray image detector as claimed in claim 8, wherein the conversion facility for converting the electrical signal into a count signal comprises at least one discriminator and at least one threshold generator.

11. The x-ray image detector as claimed in claim 10, wherein the x-ray image detector comprises at least one application specific integrated circuit (ASIC).

12. The x-ray image detector as claimed in claim 1, wherein the conversion facility for converting the electrical signal into a count signal comprises at least one discriminator and at least one threshold generator.

13. The x-ray image detector as claimed in claim 1, wherein the x-ray image detector comprises at least one application specific integrated circuit (ASIC).

14. The x-ray image detector as claimed in claim 1, wherein each counting pixel element comprises a number of discriminators and a number of threshold generators.

15. The x-ray image detector as claimed in claim 14, wherein, in the second count mode, a logic causes only that counter of the discriminators belonging to the pixel elements of the pixel structure, which comprises the highest thresholds that remain exceeded by the signal, to increase by one.

16. The x-ray image detector as claimed in claim 14, wherein, in the second count mode, the counter state of each counter is increased by one if the signal lies above the threshold of the discriminators and that, by subtraction of the counter states of the counters, the number of x-ray quanta occurring for each of the energy intervals is determined.

17. The x-ray image detector as claimed in claim 14, wherein the discriminators are window discriminators.

18. The x-ray image detector as claimed in claim 1, wherein each first memory unit is assigned precisely one second digital memory unit for storage through a transmission process of a copy of the first memory unit at the time of the transmission.

* * * * *